United States Patent [19]

Stuemky

[11] 4,280,339
[45] Jul. 28, 1981

[54] TORQUE TRANSFER DEVICE FOR FLEXIBLE SHAFT COUPLINGS

[75] Inventor: Robert E. Stuemky, Elizabeth, Colo.

[73] Assignee: The Gates Rubber Company, Denver, Colo.

[21] Appl. No.: 34,069

[22] Filed: Apr. 27, 1979

[51] Int. Cl.³ .............................................. F16D 3/18
[52] U.S. Cl. .................................... 64/9 R; 64/11 R; 403/341; 403/364
[58] Field of Search .............. 64/9 R, 11 R, 14, 28 R, 64/1 C, 1 S, 7, 8, DIG. 1; 403/341, 286, 364

[56] References Cited

U.S. PATENT DOCUMENTS

| | | | |
|---|---|---|---|
| 1,865,300 | 6/1932 | Bowen | 64/9 R |
| 2,577,508 | 12/1951 | Biggert, Jr. | 64/8 |
| 2,740,271 | 4/1956 | Beler | 64/19 |
| 2,832,943 | 4/1958 | Cutler | 403/364 |
| 3,224,222 | 12/1965 | Palmer, Sr. | 64/9 R |
| 3,362,191 | 1/1968 | Louette | 64/11 R |
| 3,552,145 | 1/1971 | Barton et al. | 64/14 |
| 3,855,817 | 12/1974 | Stuemky et al. | 64/11 B |
| 4,172,369 | 10/1979 | Hayes et al. | 64/14 |

Primary Examiner—Ira S. Lazarus
Assistant Examiner—Magdalen Moy
Attorney, Agent, or Firm—H. W. Oberg, Jr.; Raymond Fink; Curtis H. Castleman, Jr.

[57] ABSTRACT

A sporadical torque transfer device for yielding element flexible shaft couplings of the tubular type, the device including two shaft end portions, each with two forked ends of two opposed symmetrical teeth having flanks, the teeth overlapping each other in meshing fashion with nominally a positive clearance between tooth flanks, the teeth centrosymmetric with the tubular element and positioned intermediate ends of the tubular element. Optionally, a sleeve has a diametrically oriented member attached to each of its ends and positioned ninety degrees from each other. Together, the cross members and sleeve define tooth receiving openings. The sleeve is positioned substantially coaxially with the shaft portions and the opposed teeth are positioned in the tooth receiving openings of the sleeve and cross members with positive clearance nominally maintained between the tooth flanks and cross members.

10 Claims, 9 Drawing Figures

TORQUE TRANSFER DEVICE FOR FLEXIBLE SHAFT COUPLINGS

BACKGROUND OF THE INVENTION

The invention relates to flexible shaft couplings of the tubularly-shaped, yielding element type, but more particularly, the invention relates to a sporadical torque transferring device that enhances performance of a tubularly-shaped, yielding element type flexible shaft coupling.

Some yielding element type flexible shaft couplings are useful for attenuating certain noise and vibration in some rotary, articulated shaft systems. Examples of such flexible elements appear in U.S. Pat. Nos. 3,628,352; 3,855,817; 3,347,061; and 3,621,674. Apparatus for attaching such yielding element couplings to rotary shafting are shown in U.S. Pat. Nos. 3,788,098; and 3,973,411. While such couplings are suitable for such vibration and noise attenuating service, the couplings do not give suitable warning for impending failure; are susceptible to buckling failure at infrequent torque overloads; and are incapable of transferring torque for a discrete warning period before an impending failure.

SUMMARY OF THE INVENTION

In accordance with the invention, a sporadical or intermittent torque transferring device is provided for use with tubular element flexible shaft couplings. The device is disposed in the tubular element bore and arranged coaxially therewith and includes two shaft portions, each with forked ends that define two opposed symmetrical teeth, each axially aligned with its shaft portion and having faces or flanks for transmitting torque. The teeth are overlapped in a meshing fashion except that a positive clearance is nominally provided between the tooth flanks. Each shaft portion is keyed or fixedly attached to a coupling member that is attached at each end of the tubular element. During normal operation, where the shaft portions may be angularly misaligned, the flexible element maintains a positive clearance between tooth faces. However, at a sporadic peak torque overloading or at a failure mode of flexible element, the tooth flanks contact each other and transmit torque between the coupled shafts.

Optionally, a sleeve is disposed in the tubular element bore intermediate the coupling members. The sleeve may additionally have a diametrically arranged cross member at each of its ends that are located ninety degrees in relation to each other. The sleeve and cross members define a "spider" with two tooth receiving openings at each sleeve end. Shaft teeth are positioned in the tooth receiving openings at each sleeve end and a positive clearance is nominally available between the shaft teeth and cross members.

At peak torque overloads, the sleeve may enhance the buckling torque of the flexible element by preventing its inward collapse while intermittent torque overloads are transferred from the forked ends to the cross members via the spider.

The forked ends, sleeve, and cross members provide the coupling with emergency torque transmitting capability and a warning mechanism of impending failure of the flexible element by introducing noise or vibration.

An advantage of the invention is that the teeth and spider are not nominally in contact with each other and hence, noise and vibration is minimized during usual operation of the flexible element coupling.

Another advantage of the invention is that torque carrying capacity of a tubular flexible element having spiral wound spring reinforcements, is enhanced in various degrees depending on the various species of the invention used.

An object of the invention is to provide a flexible coupling having torque transmitting capacity even though the yielding element of the coupling is totally failed.

These and other objects or advantages of the invention will be apparent after reviewing the drawings and description thereof wherein.

DESCRIPTION OF PREFERRED EMBODIMENTS

Figure 1:
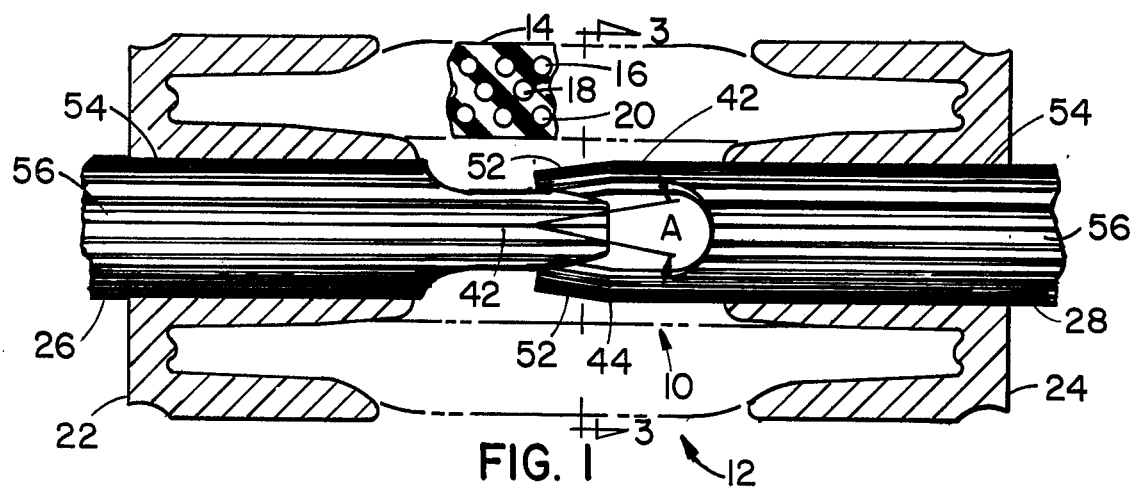
FIG. 1 is an axial side view in partial section showing the invention with a flexible shaft coupling of the yielding element, tubular type.
Figure 2:
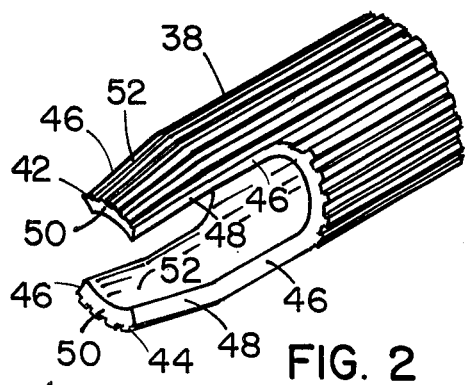
FIG. 2 is an isometric view of a shaft portion having a forked end that defines axially oriented teeth.
Figure 3:
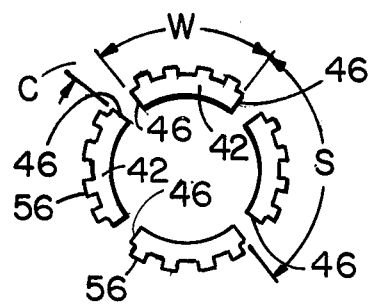
FIG. 3 is a view taken along the line 3—3 of FIG. 1.

Referring to FIGS. 1, 2 and 3, a sporadical torque transfer device 10 is provided for a flexible shaft coupling 12 of the yieldable tubular element type. Preferably, the yielding flexible element 14 is generally of the type as disclosed in U.S. Pat. No. 3,628,352 where oppositely wound spiral spring elements ae disposed in a polymeric matrix of generally tubular shape. Flexible elements of this type usually have at least three distinct annular layers of spirally wound spring elements 16, 18, 20 that are sensitive to the direction of rotation of the flexible coupling. For example, in one direction of rotation the outermost spring element 16 winds down to a smaller annular diameter and the spring element 18 inward thereto unwinds to a larger annular diameter such that the two adjacent spring elements 16, 18 press against each other or "pair" to enhance the torque carrying capability of the flexible element. Opposite rotation of the coupling reverses the winding and unwinding direction of the various spring elements causing spring element 18 to wind to a smaller diameter and "pair" with circumjacent spring elements 20 as it unwinds to a larger diameter. The torque transferring devices of the invention are especially suited for such "pairing" spring systems because they enhance the torque carrying capabilities of such a flexible element which will later be explained.

Coupling members 22, 24 are attached to each end of the flexible element. The coupling members grip the flexible element to transfer torque between attachable shafts 26, 28. The shafts may attach to the coupling members in any suitable manner such as by splines, interference fit, bolts, pins and the like. The torque transferring device of the invention may be an integral part of the flexible coupling per se by attaching to the coupling members. This requires shafts to be attached to the coupling members independent of the torque transfer device. But more preferably, the torque transferring device is made as an integral part or extension of attaching shafts or as an integral part or extension of the coupling members.

Each shaft has an extended portion 38 with a forked end 40 that defines two opposed symmetrical teeth 42, 44 oriented axially therewith. Each tooth has flanks 46 or faces that extend through narrowed portions 48 to a tooth tip 50. The end portions of the teeth preferably are canted 52 (up to about 10 degrees) and converge toward each other to provide a clearance with the flexible element as will later be discussed.

The circumferential width W of a tooth is less than the circumferential spacing S between teeth. The shafts are arranged substantially coaxially with their respective coupling member and the forked ends interfit with each other so that the teeth of the shafts are in meshing fashion. Each shaft is attached to its respective coupling member and prevented from relative rotation therewith by attachment means such as an internal spline 54 on the coupling member which keys with an external spline 56 of the shaft. The clearance C between the driving faces 46 of the shaft teeth is maintained as a function of the torsional resistance of the flexible element. For example, the clearance C may be in the order of 8-20 degrees between juxtaposed tooth faces. The teeth are so dimensioned to nominally provide a positive clearance between the adjacent tooth flanks and corners when the shafts are angularly misaligned with each other at a predetermined maximum conical operating angle A of the flexible coupling. The angle A (e.g., 25°) has an apex that generally intersects the axis of the first and second shafts juxtaposed the interfitted teeth. The convergent portions of the teeth maintain a positive clearance at the internal diameter of the flexible element at such a maximum operating angle. Of course, the amount of tooth canting is determined by the desired conical angle and the internal diameter of the flexible element relative to the external diameter of the shafts.

In use, the flexible coupling is assembled with the forked shafts as shown. Power is applied to one shaft and a power load is carried by the second shaft. The torque is carried by the yielding flexible element causing twisting thereof. The number of degrees of twist of the flexible element intermediate its coupling members is at a predetermined torque load nominally less than the number of degrees of clearance provided between the teeth driving faces whether or not the shafts are angularly misaligned relative to each other. Adjacent tooth flanks do not normally come into contact with each other except under two different types of operating conditions.

The angular clearance between adjacent tooth flanks may be chosen relatively small (e.g., 3°-8°) so that the tooth flanks contact each other at low torque levels to substantially limit the torque carried by the flexible element. In this situation the teeth act as a torque overload-limiting device for the flexible element. The flexible element per se may then be of lighter weight construction.

In other applications, the angle between tooth flanks may be somewhat larger (e.g., 8°-16°) so the teeth only operate to carry spurious unforeseen high torque overloads that could fail the flexible element. Whatever the case, the torsional spring rate of the yielding element must be considered when choosing the clearance angle between tooth flanks.

The torque transferring device of the invention also operates to transmit torque should the flexible element fail such as by buckling, aging or fatique. This permits continued operation of the flexible coupling which may be useful in emergency situations such as for automobile drive trains. The mechanical contacting of the tooth flanks at their diametric interfit (e.g., 180° apart) has the advantage of transmitting noise or vibration to signal a user of an impending failure of the flexible element. The diametric arrangement of the teeth cause noise feedback because the teeth arrangement do not transmit torque at constant velocity between the rotating shafts. The relationship is more like that of a single cardon universal joint.

As previously discussed, the innermost spirally wound spring element of a spiral reinforced coupling will wind down and get smaller in diameter when rotated in one direction under torque. Over application of torque may exceed the yield point of the spring element causing the flexible element to buckle in failure. As heretofore discussed, the forked ends of two shafts can be used to prevent such overloading of the spring elements or provide emergency torque transmission after flexible element failure.

Figure 4:
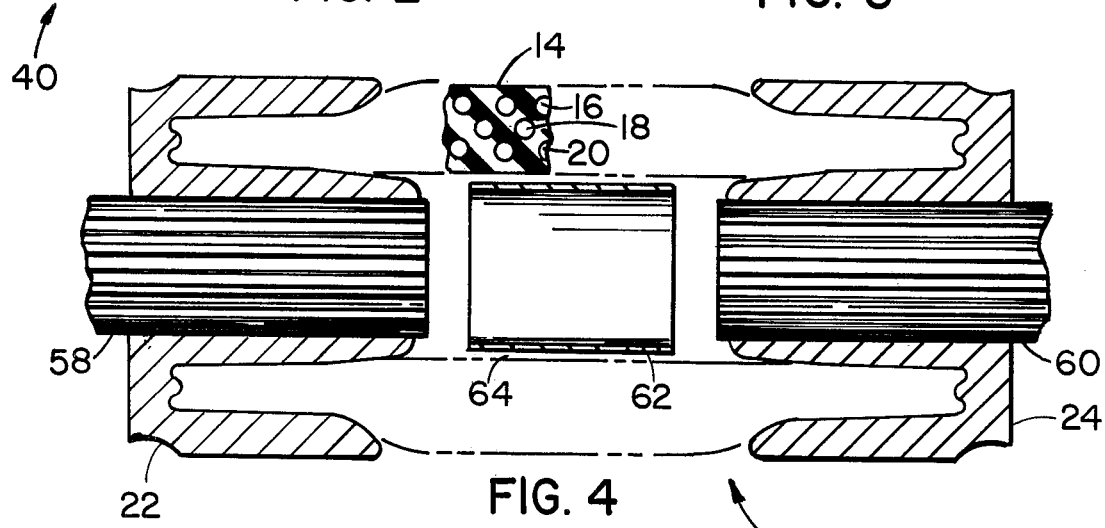
FIG. 4 is an axial side view in partial section showing a flexible shaft coupling of the yielding element type with a sleeve disposed therein.
Figure 5:
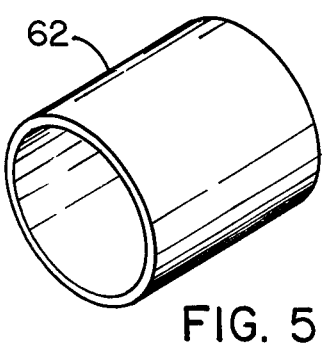
FIG. 5 is an isometric view of the sleeve shown in FIG. 4.

Referring now to FIGS. 4 and 5 another device for enhancing torque overload carrying capability of a flexible element coupling is shown. The coupling 12 has the same arrangement as that previously discussed using a tubularly-shaped, flexible element 14 with, for example, three annular springs 16, 18, 20 which are oppositely helically wound relative to each other, and end coupling members 22, 24 for attaching two shafts 58, 60. The forked shaft ends are not used in this arrangement, but rather, a sleeve 62 is disposed in the tubularly-shaped, flexible element intermediate the coupling members. In operation, the sleeve enhances the torque transmitting capability of the flexible element by lending radial support thereto as a predetermined torque is applied to the flexible element which causes radially inward movement at the inner diameter of the flexible element. In other words, the sleeve increases the torque level at which buckling of the yielding element occurs. A positive radial clearance 64 (e.g., 1 mm or greater) between the sleeve and inner diameter of the flexible element is optional to allow freedom of angular movement of the flexible element without interference from the sleeve. Optionally, the sleeve may be "barrel" shaped and snugly fit at its maximum diameter to the internal diameter of the flexible element. Clearance is allowed at the ends of the barrel sleeves for the angular movement.

Figure 6:
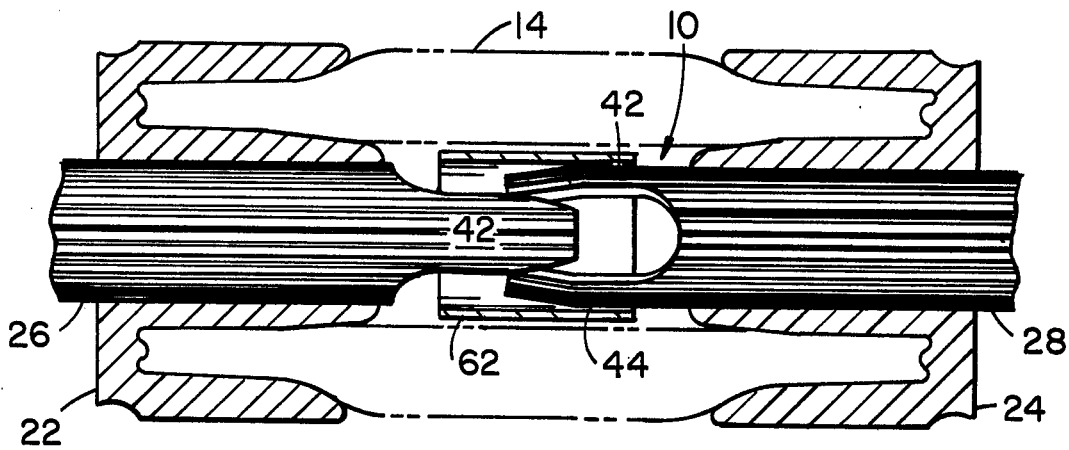
FIG. 6 is an axial side view similar to that of FIG. 1 but showing the sleeve of FIG. 5 disposed therein.

Referring now to FIG. 6, a flexible coupling 12 with a torque transferring device similar to that of FIG. 1 is shown except that a sleeve 62 as depicted in FIGS. 4 and 5 is disposed in the tubular flexible element intermediate its ends and juxtaposed the shaft teeth 42, 44. The operation of the flexible element with the torque transferring device is similar to that previously explained except for an improved temporary emergency operation period in the event of a flexible element failure such as buckling or disjunction of the flexible element. Such improvement is useful when the flexible coupling is used in a vehicle drive train. An automobile operator is provided with temporary operation of his vehicle while also being warned by means of noise or vibration, that something is wrong should the yielding element fail. Warning noise and vibration are transmitted as the tooth flanks contact and slide on each other while transfering torque at varying angular velocities. In some torque applications, the sleeve precludes disengagement of the teeth by radial spreading which thereby enhances the ultimate torque transmitting capability of the flexible coupling.

Figure 7:
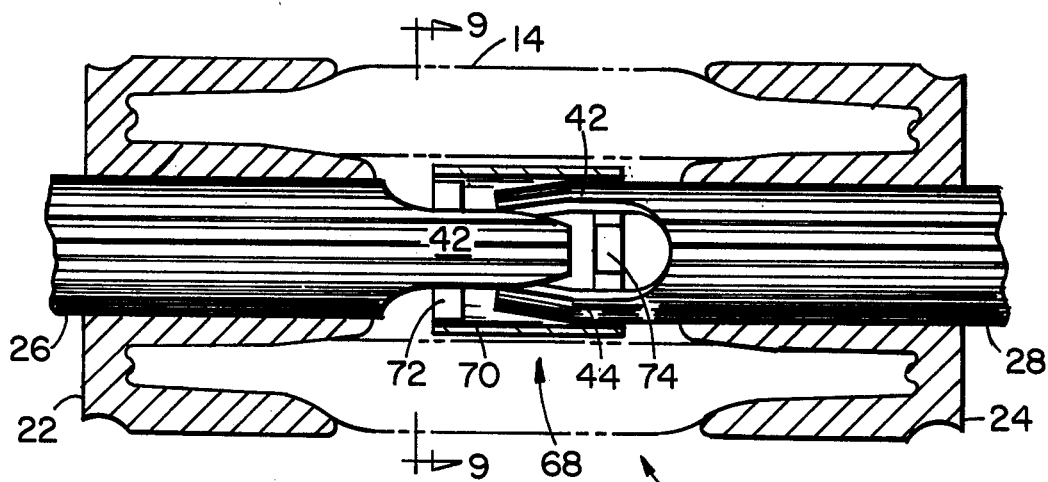
FIG. 7 is an axial side view similar to that of FIG. 1 showing a sleeve with diametric cross members at each of its ends to define a spider.
Figure 8:
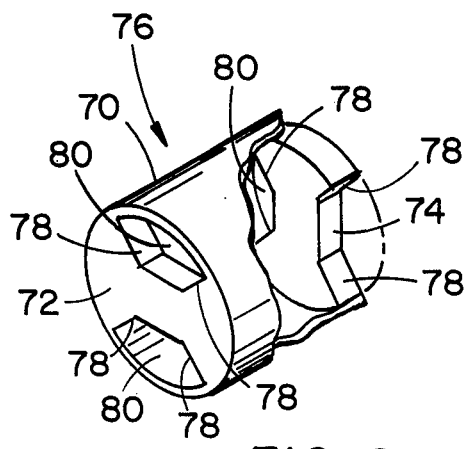
FIG. 8 is an isometric view of the spider used in FIG. 7.
Figure 9:
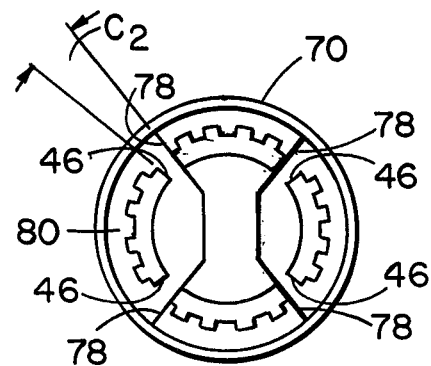
FIG. 9 is a view taken along the line 9—9 of FIG. 7.

FIGS. 7, 8 and 9 show a further improved torque transferring device 68 in terms of operational life after flexible element failure by buckling or disjunction. The flexible coupling 12 and forked shafts 26, 28 are substantially the same as previously described. An improved sleeve 70 is disposed in the flexible element intermediate its ends. The sleeve is similar to that as shown in FIG. 5 except that diametrically oriented cross members 72, 74 are attached at each end of the sleeve to define a "spider" 76. The cross members are oriented substantially ninety degrees relative to each other and each has four tooth engaging faces 78 which optionally, but preferably, are along radial lines to the sleeve. The sleeve and cross members define tooth receiving openings 80 at each end of the sleeve.

The teeth of the shafts extend into the tooth receiving openings of the spider. However, and as shown in FIG. 9, a positive angular clearance C2 is maintained under nominal flexible coupling operating conditions between the tooth flanks and cross member faces.

In operation, the flexible coupling of FIG. 7 is similar to that as previously described in that a positive clearance is maintained in the torque transferring device under nominal operating conditions. Surface contact of the tooth flanks and spider faces do not occur until a predetermined torque level is reached or when there is a failure or high torque loading of the flexible element. Torque is transferred from one shaft to the other by means of the cross members and sleeve. Improved performance in terms of longer life is realized because the cross members engage the tooth near roots of a tooth where there is less cantilevering of the tooth under load. Also, for a given angular displacement of the flexible coupling, the forked ends compensate for only half of the operating angle of the flexible coupling. This is because half of the angle change is accommodated with each forked end and its engaging cross member rather than the total angle change being accommodated by engaging shaft teeth as shown in FIG. 1.

All of the above flexible couplings under normal operating conditions retain their noise and vibration attenuating characteristics since there are no interconnecting mechanical parts between the shafts because positive clearance is maintained as above described. Except for the flexible coupling shown in FIG. 4, all flexible couplings of the invention have the added feature of torque transferring capability at high peak overloads or after flexible element failure while providing a signal of impending total failure (i.e., incapability of transferring any torque) by emitting noise and inducing vibration at some torque loadings.

The foregoing description is provided for purpose of illustration only and is not intended to limit the scope of the invention which is to be determined from the appended claims.

What is claimed is:

1. A torque transfer device for tubular, yielding element flexible shaft couplings comprising:

a first shaft portion having an external diameter, an axis and a forked end defining two opposed teeth that each have tooth flanks oriented with the first shaft axis and extending through narrowed portions to a tooth tip; and a second shaft portion having an external diameter, an axis and a forked end defining two opposed teeth that each have tooth flanks oriented with the second shaft axis and extending through narrowed portions to a tooth tip, the first and second shaft portions nominally substantially coaxially aligned with each other and the teeth interfitted with each other in meshing fashion, the teeth dimensioned to nominally provide a positive clearance between adjacent flanks and corners so that tooth flanks do not normally come into contact with each other when the shafts are angularly misaligned with each other at a predetermined conical angle having an apex that generally intersects the axis of the first and second shaft portions juxtaposed the interfitted teeth and the teeth also dimensioned so that flanks of the interfitting teeth contact each other to transfer torque when the clearance is taken up at predetermined torque overloads.

2. The torque transfer device as claimed in claim 1 wherein the tooth flanks and narrowed portions define surfaces that are substantially radial in relation to their respective shaft axis.

3. The torque transfer device as claimed in claim 1 wherein the positive clearance between the nominally aligned teeth allows about ±14 degrees relative rotation between the first and second shaft portions.

4. The torque transfer device as claimed in claim 1 wherein positive clearance between first and second shaft teeth is maintained for a conical angle up to about 25 degrees.

5. The torque transfer device as claimed in claim 1 wherein an end portion of each tooth is canted up to about 10 degrees toward its respective shaft axis.

6. The torque transfer device as claimed in claim 1 wherein each shaft portion has an external spline.

7. A torque transfer device for tubular, yielding element flexible shaft coupling comprising;

a first shaft portion having an external diameter, an axis and a forked end defining two opposed teeth that each have tooth flanks oriented with the first shaft axis and extending through narrowed portions to a tooth tip;

a second shaft portion having an external diameter, an axis and a forked end defining two opposed teeth that each have tooth flanks oriented with the second shaft axis and extending through narrowed portions to a tooth tip, the first and second shaft portions nominally substantially coaxially aligned with each other and the teeth interfitted with each other in meshing fashion, the teeth dimensioned to nominally provide a positive clearance between adjacent flanks and corners when the shafts ae angularly misaligned with each other at a predetermined conical angle having an apex that generally intersects the axis of the first and second shaft portions juxtaposed the interfitted teeth;

a sleeve having first and second open ends and an internal diameter that is greater than the external diameter of the first and second shaft portions;

a first cross member oriented substantially diametrical of and attached to the first end of the sleeve, the sleeve and first cross member defining two diametrically opposed tooth receiving openings;

a second cross member oriented substantially diametrically of the sleeve and substantially ninety degrees to the first cross member, the second cross member attached to the second end of the sleeve and defining two diametrically opposed tooth receiving openings with the sleeve, the teeth of the first shaft portion inserted in the tooth receiving openings at one end of the sleeve and the teeth of the second shaft portion inserted into the tooth receiving openings at the other end of the sleeve and wherein there is positive clearance between the teeth and the cross members.

8. A shaft for use with flexible shaft couplings of the type having a tubularly-shaped flexible element with coupling members attached at each end thereof, and having means for attachment to interconnected shafting, the improvement comprising:
   a forked end of the shaft that defines two opposed symmetrical teeth that each have two flanks oriented with an axis of the shaft, the two flanks extending through circumferentially narrowed portions to a tooth tip, and wherein the teeth have a circumferential width that is less than a circumferential spacing between the teeth.

9. A shaft as claimed in claim 8 wherein the teeth have end portions that converge toward each other.

10. In a flexible shaft coupling of the type having a tubularly-shaped yielding element with coupling members attached at opposite end portions thereof, the improvement comprising:
   a sleeve disposed in the bore of the tubular flexible element intermediate the coupling members, the sleeve having first and second ends and a first cross member oriented substantially diametrically of the sleeve and attached to the first end, the sleeve and first cross member defining two diametrically opposed tooth receiving openings; and a second cross member oriented substantially diametrically of the sleeve and at substantially ninety degrees to the first cross member, the second cross member attached to the second end of the sleeve and defining two diametrically opposed tooth receiving openings with the sleeve;
   a first shaft portion that extends axially through one coupling member and into a bore of the tubular element, first shaft portions having an external diameter, an axis, and a forked end that defines two opposed symmetrical teeth that each have tooth flanks oriented with the first shaft axis and extending through narrowed portions to a tooth tip; and
   a second shaft having an end portion that axially extends through the remaining coupling member and into the bore of the tubular element, the second shaft having an external diameter, an axis and a forked end defining two opposed symmetrical teeth that each have tooth flanks oriented with the second shaft axis and extending through narrowed portions to a tooth tip, the first and second shaft portions nominally substantially coaxially aligned with each other and the teeth extending into the tooth receiving openings, the teeth and cross members dimensioned to nominally provide a positive clearance between the tooth flanks and cross member faces.

* * * * *